United States Patent Office 3,458,549
Patented July 29, 1969

3,458,549
ORGANOTIN CHLOROPHENYL ACETATES
Richard H. Fish, Anaheim, Calif., assignor to the United States Borax & Chemical Corporation, Los Angeles, Calif., a corporation of Nevada
No Drawing. Filed Aug. 15, 1966, Ser. No. 572,182
Int. Cl. C07f 7/22; A01n 9/24
U.S. Cl. 260—429.7
10 Claims

ABSTRACT OF THE DISCLOSURE

Trialkyltin chlorophenyl acetates are provided. The compounds can be prepared by reaction of a chlorophenylacetic acid with the corresponding trialkyltin oxide or trialkyltin hydride. They are useful as herbicides.

---

This invention relates to organotin compounds, and more particularly, it relates to novel organotin chlorophenyl acetates.

According to the present invention, there are provided novel compounds of the formula

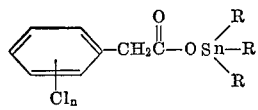

where R is lower alkyl and $n$ is an integer of from 1 to 5. Thus, each group represented by R can be the same or different lower alkyl radicals, such as methyl, ethyl, n-propyl, n-butyl, sec-butyl, n-hexyl, n-octyl, and the like. The aromatic ring can have from 1 to 5 chloro substituents, and preferably 1 to about 3 chloro substituents.

Typical examples of compounds embraced by the present invention include: trimethyltin-2-chlorophenylacetate, triethyltin 2,6-dichlorophenylacetate, tri-n-butyltin 4-chlorophenylacetate, ethyldimethyltin 4-chlorophenylacetate, tri-n-butyltin 2,4,6-trichlorophenylacetate, tri-n-hexyltin 3-chlorophenylacetate, tri-n-butyltin 2,3,6-trichlorophenylacetate.

The compounds are generally colorless, crystalline solids which are soluble in the usual organic solvents such as acetone, ether, and hexane. They are useful as herbicides and as stabilizers for polymers such as polyvinyl chloride.

The novel tin compounds of this invention are readily prepared by reaction of a chlorophenylacetic acid with the corresponding trialkyltin oxide or trialkyltin hydride. The reactions can be illustrated by the following equation:

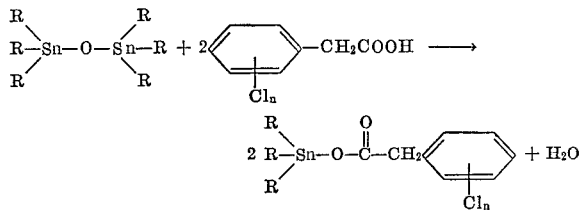

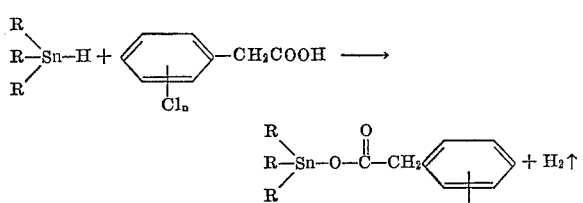

in which R and $n$ have the significance previously assigned.

Thus, when a trialkyltin oxide is employed as the reactant, the mole ratio of organotin compound to chlorophenylacetic acid is preferably about 1:2. When an organotin hydride is used, the tin compound and chloro phenylacetic acid are combined in about equimolar amounts. The reactions take place preferably at elevated temperatures, such as in the range of from about 50° C. to about 120° C. and give high yields of the desired product. An inert liquid reaction medium, such as hexane and dioxane, can be used for ease of handling the reactants and control of the reaction temperature. The desired products are isolated and purified by conventional procedures well known to those skilled in the art.

The following examples illustrate the preparation of representative compounds of this invention, but it is to be understood that the invention is not to be considered limited to the specific examples given.

EXAMPLE I

Tri-n-butyltin 4-chlorophenylacetate

To a reaction flask equipped with a magnetic stirring bar, reflux condenser and a serum cap was added 1.84 grams (0.108 mole) of 4-chlorophenylacetic acid dissolved in 18 ml. of a hexane-ether (5:1) mixture. To this stirring solution was added via a syringe 3.22 grams (0.054 mole) of tri-n-butyltin oxide at room temperature. The reaction mixture was refluxed for 17 hours and then concentrated using a Rinco evaporator. The remaining residue was cooled, affording 4.4 grams (88%) of the product, which was isolated by filtration, M.P. 62.5°–63.5° C.

EXAMPLE II

Tri-n-propyltin 3-chlorophenylacetate

In a three-neck flask equipped with magnetic stirring bar, addition funnel and reflux condenser was placed 3.41 grams (0.02 mole) of m-chlorophenylacetic acid in 30 ml. of dry ether. To this stirring and refluxing solution was added dropwise 4.96 grams (0.01 mole) of tripropyltin oxide in 15 ml. of dry ether. The reaction mixture was refluxed for 15 hours and then cooled to room temperature. The ether was removed by distillation and the resulting solid residue was recrystallized from pentane to give 5.2 grams (61%) of product, M.P. 44°–45.4° C.

EXAMPLE III

Triethyltin 2,6-dichlorophenylacetate

In a flask equipped with a reflux condenser and magnetic stirring bar was placed 1.02 grams (0.005 mole) of 2,6-dichlorophenylacetic acid in 20 ml. of ether and 15 ml. of hexane. To this solution was added 1.03 grams (0.005 mole) of triethyltin hydride. The reaction mixture was refluxed for 15 hours, then cooled to room temperature. The solvent was removed by distillation to give 1.1 grams (54%) of product, M.P. 125°–126° C.

EXAMPLE IV

Tri-n-butyltin 2,3,6-trichlorophenylacetate

In a flask equipped with a reflux condenser, addition funnel and magnetic stirring bar was placed 2.8 grams (0.017 mole) of 2,3,6-trichlorophenylacetic acid containing other trichloro isomers in 25 ml. of hexane. To this solution was added 5.1 grams (0.0085 mole) of tributyltin oxide and the reaction mixture was refluxed for 12 hours. The solvent was removed by distillation to give 4.0 grams (38%) of oily, crystalline produce which was predominately the 2,3,6-trichloro isomer. After treatment with decolorizing charcoal and recrystallization from hexane, a crystalline produce melting at 82°–87° C. was obtained.

The organotin compounds of this invention are effective herbicidal compounds, useful for controlling the growth of unwanted plants. The compounds are useful as a pre-emergence or post-emergence treatment; that is, they can be used to suppress the growth of or kill growing plants, or they can be used to kill or prevent the emergence of seedlings of unwanted plants. Generally, an application rate of from about 0.5 to about 25 pounds of one or more of the active compounds per acre is an effective herbicidal amount. At low application rates, such as from about 3 to about 15 pounds per acre, the compounds are especially useful as selective herbicides for controlling weed growth in desirable crops such as safflower, peanuts and cotton.

The following example illustrates the herbicidal activity of a representative compound of this invention.

EXAMPLE V

Tri-n-butyltin 4-chlorophenylacetate in methanol solution was applied at a rate of 4 pounds per acre as a pre-emergence treatment to the weeds mustard, bindweed, ragweed, velvetleaf, lamb's quarter, pigweed, foxtail, ryegrass, watergrass, wild oats, Johnson grass and crabgrass and the crops of safflower, peanuts and cotton. Thirty-four days after treatment, a complete kill or non-emergence of all weeds was observed with no injury to the safflower, peanuts and cotton.

Since a relatively small amount of the active compound should be uniformly distributed over the area to be treated, the compounds preferably are formulated with conventional herbicide carriers, either liquids or pulverulent solids, following procedures well known to those skilled in the herbicide formulation art. Such formulations preferably include a surfactant to aid in dispersion, emulsification and coverag. Other herbicidal materials, such as the alkali metal borates and chlorates and other organic herbicides, can also be included in the formulations.

Use of the compounds of the present invention as herbicides is disclosed and claimed in a copending application of Richard H. Fish and Cecil W. LeFevre Ser. No. 583,995, filed Oct. 3, 1966 which is assigned to the assignee of the present application.

Various changes and modifications of the invention can be made and, to the extent that such variations incorporate the spirit of this invention, they are intended to be included within the scope of the appended claims.

What is claimed is:

1. A compound of the formula

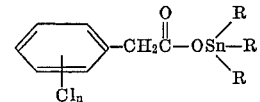

where R is lower alkyl and $n$ is an integer of from 1 to 5.

2. A compound according to claim 1 in which $n$ is 1 to about 3.

3. A compound according to claim 1 in which R is n-butyl.

4. A compound according to claim 1 in which R is ethyl.

5. A compound according to claim 1 in which R is n-propyl.

6. Tri-n-butyltin 4-chlorophenylacetate.
7. Tri-n-propyltin 3-chlorophenylacetate.
8. Triethyltin 2,6-dichlorophenylacetate.
9. Tri-n-butyltin 2,3,6-trichlorophenylacetate.
10. Trimethyltin 2-chlorophenylacetate.

References Cited

UNITED STATES PATENTS

| 2,560,034 | 7/1951 | Eberly | 260—429.7 |
| 3,031,483 | 4/1962 | Koopmans et al. | 260—429.7 |
| 3,016,369 | 1/1962 | Montermoso et al. | 260—429.7 X |
| 3,029,267 | 4/1962 | Berenbaum et al. | 260—429.7 |

FOREIGN PATENTS 797,073  6/1958  Great Britain.

OTHER REFERENCES

Blum et al., J. Economic Entomol, vol. 50, p. 84, 1957.
Dub, Organometallic Cpds, vol. II, 1963), pp 205–09.

TOBIAS E. LEVOW, Primary Examiner

W. F. W. BELLAMY, Assistant Examiner

U.S. Cl. X.R.

71—97